Nov. 8, 1960    F. P. VANAMAN ET AL    2,959,709
AUTOMATIC HEADLIGHT DIMMING SYSTEM
Filed June 17, 1958
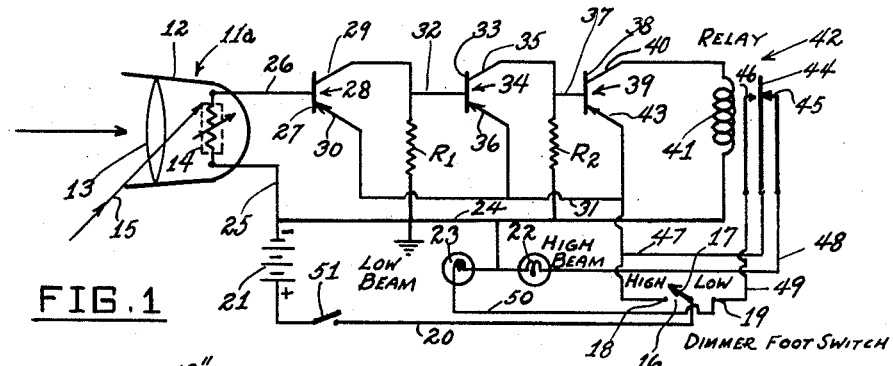
FIG.1
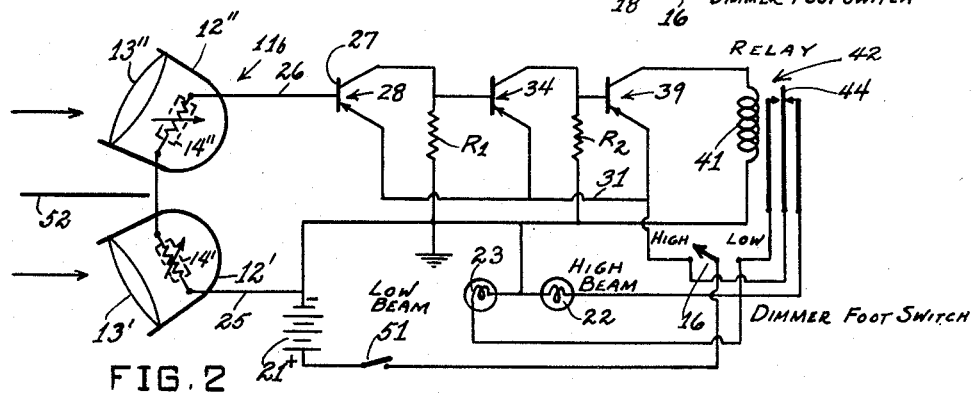
FIG.2
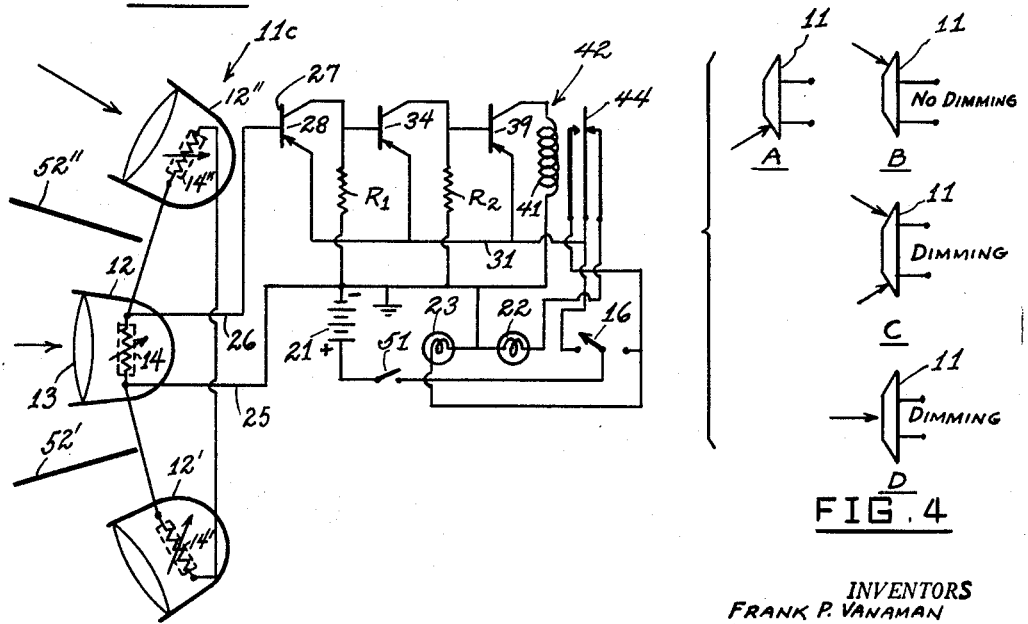
FIG.3
FIG.4
INVENTORS
FRANK P. VANAMAN
CHARLES H. ODOM
BY HERMAN L. GORDON
ATTORNEY United States Patent Office 2,959,709
Patented Nov. 8, 1960

2,959,709
AUTOMATIC HEADLIGHT DIMMING SYSTEM

Frank P. Vanaman and Charles H. Odom, New Hyde Park, N.Y., and Herman L. Gordon, Silver Spring, Md., assignors to Television Utilities Corporation, Corona, N.Y.

Filed June 17, 1958, Ser. No. 742,518

6 Claims. (Cl. 315—83)

This invention relates to automatic means for dimming the headlights of a motor vehicle, and more particularly to a headlight dimming system of the type employing photo-sensitive detector means acting in response to the headlight beam of an approaching vehicle to automatically dim the headlights of the vehicle equipped with the detector means.

A main object of the invention is to provide a novel and improved automatic headlight dimming system for a motor vehicle, said system being energized directly from the vehicle battery, requiring no additional power supply means, involving relatively simple components, and being reliable in operation.

A further object of the invention is to provide an improved automatic headlight dimming system which employs relatively inexpensive parts, which is very easy to install on a vehicle, which is compact in size, and which is substantially instantaneous in response.

A still further object of the invention is to provide an improved automatic headlight dimming system for a motor vehicle which is not affected by light sources at one side of the roadway, such as illuminated road signs, illuminated store windows, street lights, or the like, but which responds to light sources directly in front of the equipped vehicle, such as the headlights of approaching vehicles, or the tail lights of a vehicle directly in front of the equipped vehicle.

A still further object of the invention is to provide an improved headlight dimming system which does not respond to light sources at one side of the equipped vehicle, but which responds to light sources directly in front of the equipped vehicle or to the simultaneous presence of light sources on both sides of the equipped vehicle, so that its headlights are automatically dimmed when the vehicle is proceeding through brightly lighted areas, such as through brightly lighted streets where it is not necessary to employ a high degree of illumination of the vehicle headlights.

Further objects and advantages of the invention will become apparent from the following description and claims, and from the accompanying drawings, wherein:

Figure 1 is a schematic diagram illustrating one form of the improved automatic headlight dimming system of the present invention and showing its electrical connections.

Figure 2 is a schematic diagram of another form of automatic headlight dimming system according to this invention.

Figure 3 is a schematic diagram of a still further form of automatic headlight dimming system according to the present invention.

Figure 4 is a diagram showing how the automatic headlight dimming system of the present invention discriminates between various types and directions of illumination from light sources ahead of and to the side of a vehicle equipped with the improved system.

Referring to the drawings, and more particularly to Figure 1, 11a designates a detector unit which may be mounted on any suitable forward portion of a motor vehicle, facing forwardly, as shown, so as to receive rays of light from a light source in front of the vehicle, for example, from the headlights of an approaching vehicle. The detector unit 11a comprises a housing 12 provided in its forward end portion with a focussing lens 13 which is arranged to focus the light rays on a photo-sensitive element 14 mounted in the rear portion of housing 12.

Preferably, the focussing lens 13 is located a substantial distance inwardly of the housing 12 so that the side walls of the housing limit the entry of light rays from the side of the roadway. The lens 13 further acts to limit the transmission of rays to element 14 to those included within a specified angle with respect to the direction of movement of the vehicle, so that the photo-sensitive element will not be substantially affected by light sources at extreme angles to the direction of movement of the vehicle, such as illuminated road signs, lighted store windows, overhead street lighting fixtures, or the like. For example, Figure 1 shows at 15 a light ray substantially at the limiting angle of perception of photosensitive element 14.

The light-sensitive cell 14 is of any suitable type having proper spectral response, such as a crystalline cadmium selenide element, crystalline cadmium sulphide, or any other suitable photosensitive material whose electrical resistance varies inversely in accordance with the intensity of light radiation impinging thereon. Preferably, the element 14 is substantially rectangular in shape and is approximately three times as long in its horizontal direction as in its vertical direction to limit the horizontal and vertical acceptance angles thereof as above described and has a spectral response peaking at approximately 6150 angstrom units, so that the cell will respond to ordinary incandescent lamp light and also to the light emitted from the tail lights of a preceding vehicle.

Designated at 16 is the conventional foot-operated dimmer switch of the motor vehicle. Switch 16 comprises a movable pole 17 and respective stationary contacts 18 and 19. Pole 17 is connected by a wire 20 and a control switch 51 to the ungrounded (positive) terminal of the vehicle battery 21.

The "high beam" headlight system of the vehicle is designated at 22 and the "low beam" headlight system is designated at 23. Each of the headlight systems 22 and 23 has one terminal thereof connected to a common grounded conductor 24, to which is also connected the remaining (negative) terminal of the vehicle battery 21. One terminal of the photo-sensitive cell 14 is grounded, as by a wire 25. The remaining terminal of the cell 14 is connected by a wire 26 to the base 27 of a transistor 28 of the p-n-p type.

The collector 29 of transistor 28 is connected to the grounded conductor 24 through a resistor $R_1$. The emitter 30 is connected to the "high beam" switch contact 18 by a wire 31.

Collector 29 is connected by a wire 32 to the base 33 of a second p-n-p transistor 34. The collector 35 of transistor 34 is connected to grounded conductor 24 through a resistor $R_2$. The emitter 36 of transistor 34 is connected to wire 31.

Collector 35 is connected by a wire 37 to the base 38 of a third p-n-p transistor 39. The collector 40 of transistor 39 is connected to grounded conductor 24 through the winding 41 of a sensitive relay 42. The emitter 43 of transistor 39 is connected to the wire 31.

Relay 42 is provided with a movable armature 44 normally engaging a stationary contact 45 and movable into engagement with an opposing stationary contact 46 responsive to the energization of winding 41 by a predetermined amount of current flow from the collector 40. Armature 44 is connected by a wire 47 to the wire 31. Contact 45 is connected by a wire 48 to the ungrounded terminal of the "high beam" headlight system 22. Contact 46 is connected by a wire 49 to the "low beam" dimmer switch contact 19. The ungrounded terminal of the "low beam" headlight system 23 is connected by a wire 50 to said switch contact 19.

Foot switch 16 may be operated in the normal manner to engage pole 17 either with contact 19, to provide the "low" headlight beam, or with contact 18, to provide the "high" headlight beam under normal conditions. However, when pole 17 is in engagement with contact 18, the system is subject to automatic dimming action in response to light focussed on cell 14, as will now be described.

The system is placed in operation initially by closing the main headlight switch 51 and switching the dimmer foot switch 16 to the "high beam" position, namely, by moving pole 17 into engagement with contact 18. This operation applies the vehicle battery voltage to the transistor circuitry, and due to the fact that there are no heaters or filaments in the circuit, the system is immediately ready for operation.

The light-sensitive cell 14 operates in a manner to decrease its resistance with an increase of light intensity on its face, and conversely, to increase its resistance as the intensity on its face decreases.

As the intensity of the light on the face of the cell 14 increases, the magnitude of the voltage appearing between the base 27 of transistor 28 and the grounded conductor 24 decreases. This action causes a reduction in the collector current flowing from the collector 29 of transistor 28, and hence a voltage increase between collector 29 and grounded conductor 24.

Transistor 28 is direct-coupled to the base 33 of transistor 34, and hence any voltage changes which appear between collector 29 and ground also appear between base 33 of transistor 34 and ground. As the voltage at base 33 increases, the current flowing from the collector 35 of transistor 34 decreases and the voltage appearing between collector 35 and ground is decreased.

Since transistor 34 is direct-coupled to the base 38 of transistor 39, as the voltage drop across resistor $R_2$ decreases, the collector current from collector 40 of transistor 39 increases, and, assuming that sufficient light has been collected by the optical system and concentrated on the light-sensitive cell 14, the amplitude of this collector current will be of sufficient magnitude to energize the winding 41 of relay 42, causing armature 44 to disengage from contact 45 and engage the opposing contact 46, thus deenergizing the "high beam" headlight system 22, and energizing the "low beam" headlight system through a circuit comprising battery 21, switch 51, wire 20, pole 17, contact 18, wire 31, wire 47, armature 44, contact 46, wire 49, wire 50, "low beam" headlight system 23, and ground.

Resistors $R_1$ and $R_2$ are provided to establish the initial bias on transistors 34 and 39.

Removal of the light flux from the light-sensitive cell 14 will, in a similar manner, cause currents to flow in a manner to lessen the collector current of transistor 39, thus causing relay 42 to release, causing the return of the system to its original condition wherein the "high beam" headlight system 22 is energized.

Because the sensitivity of cell 14 is such that normally distributed light from the headlights of an oncoming vehicle will not have sufficient intensity to cause a large enough change in resistance of the cell 14 to energize relay winding 41, the lens 13 is provided to gather the received light and focus it on the face of the cell, whereby to provide a relatively high light intensity thereon. As above explained, an additional function of the optical system comprising assembly 11a is to control the viewing angles of said assembly. Thus, the optical system will not be able to "see" light sources which are at extreme angles to the direction of travel of the vehicle.

As above mentioned, the cell 14 preferably has a spectral response peaking at approximately 6150 angstrom units. This enables the system to function when the equipped vehicle approaches a set of tail lights on the rear of a preceding vehicle, thus automatically dimming the headlights of the equipped vehicle so that said headlights do not blind the driver of the preceding vehicle via his rear view mirror.

In the form of the invention illustrated in Figure 2, the light detecting portion 11b of the system comprises a pair of identical housings 12' and 12" mounted symmetrically in a horizontal plane on opposite sides of a vertical longitudinal baffle plate 52 secured on the front of the vehicle and extending forwardly a substantial distance from the housings 12' and 12", as shown. The housings are oriented at equal angles to the baffle plate 52, so that their optical axes diverge forwardly. Respective focussing lenses 13' and 13" are mounted in the forward portions of the housings 12' and 12", said lenses being focussed on respective light-sensitive cells 14' and 14" mounted in the rear portions of said housings. The cells 14' and 14" are of the same type as employed in Figure 1, and are connected in series between wires 26 and 25. Thus, the transistorized switching circuit is controlled by the series resistance of the cells 14' and 14", and will not respond unless both cells simultaneously receive substantial quantities of light flux. Thus, the headlights of an approaching vehicle will cause both cells 14' and 14" to receive light flux of high intensity, lowering the electrical resistance of both cells sufficiently to trigger the relay 42. However, side light received by only one of the housings 12' or 12" will cause a reduction in resistance only of its associated photo-sensitive cell, which will be insufficient to lower the resistance of the series-connected cells to the triggering value required to energize relay 42. However, side light received simultaneously by both housings 12' and 12", if of sufficient intensity, will have the same effect as the headlights of an approaching vehicle, and will cause automatic dimming of the headlights of the equipped vehicle. This will occur when the vehicle is travelling along brightly illuminated streets or in other brightly illuminated areas where it is unnecessary to employ the "high" beam.

Figure 3 illustrates another form of the invention wherein the light detecting portion 11c of the system comprises three identical housings 12, 12' and 12" mounted on the forward portion of the vehicle, the housing 12 being arranged with its optical axis parallel to the direction of travel of the vehicle and the housings 12' and 12" being angled symmetrically on opposite sides of housing 12 in a horizontal plane, as shown. Respective vertical baffle plates 52' and 52" are mounted on the vehicle on opposite sides of housing 12 and between housing 12 and the respective outer housings 12' and 12", being angled symmetrically relative to housing 12 and extending substantial distances forwardly of the housings 12, 12' and 12" so as to shield housing 12 from side light from opposite sides of the vehicle.

The housings 12, 12' and 12" are provided at their forward ends with respective lenses 13, 13' and 13" focussed on respective light-sensitive cells 14, 14' and 14" mounted in the rear portions of the housings, said cells being similar to the cell 14 of Figure 1.

Cell 14 is connected between the wires 26 and 25 in the same manner as in Figure 1. Cells 14' and 14" are connected in series across wires 26 and 25 in the same manner as in Figure 2. Thus, light from the headlights of an approaching vehicle will be simultaneously received by all three cells 14, 14' and 14", lowering the resultant network resistance across the wires 26 and 25 sufficiently to trigger relay 42. The same action will occur when light is received simultaneously by cell 14 and one of the side cells 14' or 14", since the circuit would respond even if light of substantial intensity were received only by the center cell 14. This assures automatic dimming action where the approaching vehicle is travelling toward the equipped vehicle on a sharply curved portion of the roadway. However, side light reaching only one of the cells 14' or 14" would not lower the network resistance sufficiently to trigger relay 42.

As in Figure 2, side light of substantial intensity reaching both of the side cells 14' and 14" simultaneously causes their series resistance to drop sufficiently to trigger relay 42 and to cause automatic dimming action, whereby the vehicle headlights are dimmed when travelling along brightly illuminated streets and similar areas of high light level.

Figure 4 diagrammatically illustrates the ability of the systems illustrated in Figures 1, 2 and 3 to discriminate between various conditions of forward illumination. Thus, the light detecting portion 11 of a system according to the present invention will not cause automatic dimming in response to light reaching same only from either side, as in diagrams A and B of Figure 4. However, the light detecting portion 11 will cause automatic dimming when it receives light of substantial intensity forwardly, as in diagram D. Diagram C illustrates the dimming action obtained in the forms of the invention illustrated in Figures 2 and 3 when side light is received simultaneously from both sides of the light detecting portion 11.

While certain specific embodiments of an improved automatic headlight dimming system have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an automatic headlight dimming system for a motor vehicle having a battery, photo-sensitive detector means including a pair of series-connected, spaced light-sensitive elements whose electrical resistance varies inversely in accordance with the intensity of light impinging thereon, means surrounding the respective elements and limiting the reception of light rays thereby to substantially horizontal directions diverging from each other by a substantial horizontal angle and angled substantially symmetrically with respect to a vertical plane located between the elements, a transistor having a base, a collector and an emitter, means to connect one terminal of the battery to said base through said detector means, means to connect the other terminal of the battery to said emitter, a bias resistor, means to connect said collector to said one terminal through said bias resistor, whereby to increase the voltage across said bias resistor when light of substantial intensity impinges simultaneously on both of said elements, a dimmer relay, and means to actuate said dimmer relay responsive to said increase in voltage across the bias resistor, the variation of electrical resistance of said elements being such that the increase in voltage across said bias resistor when light impinges on only one of said elements is insufficient to actuate said dimmer relay.

2. In an automatic headlight dimming system for a motor vehicle having a battery, photo-sensitive means including a network of spaced interconnected light-sensitive elements whose electrical resistance varies inversely in accordance with the intensity of light impinging thereon, means surrounding the respective elements and limiting the reception of light rays thereby to substantially horizontal directions diverging from each other by substantial horizontal angles, a transistor having a base, a collector and an emitter, means to connect one terminal of the battery to said base through said network, means to connect the other terminal of the battery to said emitter, a bias resistor, means to connect said collector to said one terminal through said bias resistor, said network being constructed and arranged to provide a substantial increase in voltage across said bias resistor when light of substantial intensity impinges simultaneously on any two of the elements of the network, a dimmer relay, and means to actuate said dimmer relay responsive to said increase in voltage across said bias resistor, the variation of electrical resistance of said elements being such that the increase in voltage across said bias resistor when light impinges on only one of said elements is insufficient to actuate said dimmer relay.

3. In a motor vehicle having a battery, a headlight dimming system comprising photo-sensitive detector means arranged to receive light from sources located forwardly of the vehicle and laterally thereof, said means including a network of spaced, interconnected light-sensitive elements whose electrical resistance varies inversely in accordance with the intensity of light impinging thereon, means surrounding the respective elements and limiting the reception of light rays thereby to substantially horizontal directions diverging from each other by substantial horizontal angles, a transistor having a base, a collector and an emitter, means to connect one terminal of the battery to said base through said network, means to connect the other terminal of the battery to said emitter, a bias resistor, means to connect said collector to said one terminal through said bias resistor, said network being constructed and arranged to provide a substantial increase in voltage across said bias resistor when light of substantial intensity impinges simultaneously on any two of the elements of the network, a dimmer relay, and means to actuate said dimmer relay responsive to said increase in voltage across the bias resistor, the variation of electrical resistance of said elements being such that the increase in voltage across said bias resistor when light impinges on only one of said elements is insufficient to actuate said dimmer relay, said first-named means including vertical baffle members disposed between the elements and being constructed and arranged to separate the light from said sources impinging on the respective elements.

4. In a motor vehicle having a battery, a headlight dimming system comprising photo-sensitive detector means arranged to receive light from sources forwardly of the vehicle and laterally thereof, said means including a network of spaced, interconnected light-sensitive elements whose electrical resistance varies inversely in accordance with the intensity of light impinging thereon, means surrounding the respective elements and limiting the reception of light rays thereby to substantially horizontal directions diverging from each other by substantial horizontal angles, a transistor of the p-n-p type having a base, a collector and an emitter, means to connect the negative terminal of the battery to said base through said network, means to connect the positive terminal of the battery to said emitter, a bias resistor, means to connect said collector to said negative terminal through said bias resistor, said network being constructed and arranged to provide a substantial increase in voltage across said bias resistor when light of substantial intensity impinges simultaneously on any two of the elements of the network, a dimmer relay, and means to energize said dimmer relay responsive to said increase in voltage across the bias resistor, the variation of electrical resistance of said elements being such that the increase in voltage across said bias resistor when light impinges on only one of said elements is insufficient to actuate said dimmer relay.

5. In a motor vehicle, a "high beam" headlight system, a "low beam" headlight system, a source of direct current, a dimmer relay, means connecting the "high beam" headlight system to said source of current when the dimmer relay is deenergized, means to connect said "low beam" headlight system to said source of current in place of the "high beam" headlight system responsive to the energization of said dimmer relay, photo-sensitive detector means comprising a plurality of spaced light-sensitive elements constructed and arranged to receive light independently of each other, each element having an electrical resistance varying inversely in accordance with the intensity of light impinging thereon, means surrounding the respective elements and limiting the reception of light rays thereby to substantially horizontal directions diverging from each other by substantial horizontal angles, means electrically connecting said elements to said source in a network including said dimmer relay, and means in said network to energize said dimmer relay from said source responsive to the simultaneous reception of light of substantial intensity by any two of said elements, the variations of electrical resistance of said elements being insufficient to energize said dimmer relay when light impinges on only one of said elements.

6. In a motor vehicle, a "high beam" headlight system, a "low beam" headlight system, a source of direct current, a dimmer relay, means connecting said "high beam" headlight system to said source of current when the dimmer relay is deenergized, means to connect said "low beam" headlight system to said source of current in place of the "high beam" headlight system responsive to the energization of said dimmer relay, photo-sensitive detector means comprising a plurality of spaced light-sensitive elements constructed and arranged to receive light independently of each other, each element having an electrical resistance varying inversely in accordance with the intensity of light impinging thereon, said light-sensitive elements having a spectral response peaking at approximately 6150 angstrom units, means surrounding the respective elements and limiting the reception of light rays thereby to substantially horizontal directions diverging from each other by substantial horizontal angles, means electrically connecting said elements to said source in a network including said dimmer relay, and means in said network to energize said dimmer relay from said source responsive to the simultaneous reception of light of substantial intensity by any two of said elements, the variation of electrical resistance of said elements being insufficient to energize said dimmer relay when light impinges on only one of said elements.

References Cited in the file of this patent

UNITED STATES PATENTS

| | | |
|---|---|---|
| 1,694,511 | Von Der Lippe-Lipski | Dec. 11, 1928 |
| 2,415,179 | Hurley | Feb. 4, 1947 |
| 2,577,814 | Saunderson et al. | Dec. 11, 1951 |
| 2,750,453 | Pritchard | June 12, 1956 |

OTHER REFERENCES

Penfield: "Transistorized Headlight Dimmer," Radio and Television News, August 1955; pp. 55, 56, 122.